(12) United States Patent
Owades

(10) Patent No.: US 6,858,246 B2
(45) Date of Patent: Feb. 22, 2005

(54) PROCESS FOR PRODUCING A MALT BEVERAGE HAVING A GREATLY DIMINISHED BITTERNESS

(76) Inventor: Joseph L. Owades, 3097 Wood Valley Rd., Sonoma, CA (US) 95476

(*) Notice: Subject to any disclaimer, the term of this patent is extended or adjusted under 35 U.S.C. 154(b) by 233 days.

(21) Appl. No.: 09/833,924

(22) Filed: Apr. 12, 2001

(65) Prior Publication Data

US 2002/0150667 A1 Oct. 17, 2002

(51) Int. Cl.⁷ .............................................. C12C 11/00
(52) U.S. Cl. ...................................................... 426/592
(58) Field of Search ......................................... 426/592

(56) References Cited

PUBLICATIONS

Stoyanova, M., Nauka za Gorata, vol. 30, (4), pp. 46–50, 1993.*
www.treesforlife.org.uk/tfl.mythjuniper.html.*

*Brewing Techniques–Explorations in Pre–Prohibition American Lagers*, by George Fix, May/Jun., 1994, pp. 28–31.

*Herbs Used in Brewing Beer and Ale*, by Peggy Gilmour (date unknown), pp. 1–20.

*Brother Gore's Treehugger's Ale*, (author unknown), Oct. 28, 1998, pp. 1–2.

*Homebrew Digest* #1920, by Jack D. Hill, Dec. 27, 1995, pp. 1–8.

* cited by examiner

*Primary Examiner*—Curtis E. Sherrer
(74) *Attorney, Agent, or Firm*—Hayes Soloway P.C.

(57) ABSTRACT

Addition of juniper berry oil to a malt beverage after completion of the brewing process, in an amount below the threshold where it imparts any perceptible juniper berry flavor to the beverage, mitigates or nullifies bitterness imparted the hops.

6 Claims, No Drawings

PROCESS FOR PRODUCING A MALT BEVERAGE HAVING A GREATLY DIMINISHED BITTERNESS

FIELD OF THE INVENTION

The present invention relates generally to the production of malt beverages, and more particularly to the production of hop-containing beverages, without the typical bitterness of hops (*humulus lupulus*).

BACKGROUND OF THE INVENTION

Hops are universally used in the production of malt beverages such as beer or ales, because they impart important properties to these beverages. These include preservative, or anti-microbial properties, particularly against gram negative organisms; bitterness, imparted by a set of organic compounds called "humulones," which are isomerized by the brewing process to a related set of compounds called "isohumulones;" aroma, a uniquely floral bouquet, characterized as "hop bouquet;" and foam enhancement, or "lacing," due to surface properties of some components of hops. In the U.S. the use of hops is mandatory by the United States Bureau of Alcohol and Firearms, in the amount of 7.5 lbs. per 100 bbls. of brewed beer. In all other countries, the use of hops is mandated by custom and the special properties of hops.

Beers and ales are made by an infusion of barley malt and other grains into warm water. Conventional mashing involves mixing together of malt and cereal adjuncts in warm water, followed by a series of heating and resting cycles. Following mashing, the soluble materials are extracted in a lauter tub, leaving behind the spent grain. A clear liquid (wort) obtained by the extraction may then be transferred to a brew kettle and boiled for a period of time which inactivates the malt enzymes, and extracts the bitterness principles of hops. Wort compositions vary depending on raw materials and mash cycles employed.

A typical wort used in brewing may be composed of the mixed extract of a barley malt mash and a cereal adjuncts mash, typically of corn grits or rice. Such mixed extract may be obtained by treating a dried barley malt with warm water, at about 50° C., in one vessel, the so-called "mash tub" and boiling the cereal adjuncts, (e.g. corn grits or rice) in another vessel, the so-called "cooker," and then adding the boiling contents of the cooker to the warm malt suspension in the mash tub. This serves to raise the temp. of the mash tub contents to about 57°–67° C. During the rise from 50° C., to about 67° C., and starting at around 63° C., the enzymes in the malt and in particular beta-amylase which is most active between 60° and 70° C., partially degrade the starches in both the malt itself and in the corn grits or rice to form simple fermentation sugars, primarily glucose, fructose and maltose. These simple sugars are fairly sweet tasting, and also are fermentable by Brewers' years to alcohol and carbon dioxide.

The combination mash is then filtered in a lauter tub, mash filter or other means and the resulting wort boiled with hops to extract the bitter components and other components, filtered, cooled and fermented with yeast, and carbonated to produce a beer or ale.

OBJECT OF THE INVENTION

It is an object of the present invention to provide a process for the production of malt beverages having the desired characteristics of hops, without the typical bitterness of hops.

BRIEF DESCRIPTION OF THE INVENTION

I have found that the addition of juniper berry oil at levels below the amount which produces the distinct aroma and taste of juniper berry oil to a brewed malt beverage, i.e. following fermentation, serves to mitigate or even to nullify the bitterness imparted by hops. The isohumulones, conveyed into the beer by isomerized humulones, are the vehicle of the bitterness in the malt beverage. In the past, brewers who have chosen to have low bitterness in their beer, have also been forced to have low hop aroma in their beer. Also they have to lower the other properties of hops. Brewers have resorted to the use of varieties of hops which have low inherent lower level of humulones, say about 2–4% of humulones, instead of 6–12% of humulones. But they have hops which have measured levels of humulones, and so have low measures of lower level of other measures of hops which have important properties for beer. This invention allows those brewers to raise their level of hops and not to raise their level of bitterness simultaneously.

With my invention, brewers can use all the hops they want for their other properties like aroma or foam, and they can mitigate or nullify the bitterness that this level of hops which normally impart. Thus, a brewer can hop his beer without regard to its resultant bitterness, just paying attention to its aroma, foam and anti-bacterial activity.

The level of juniper berry oil needed for this invention is much below the threshold of aroma and taste for juniper berry oil.

Hops have been used for about 500 years, but before then several herbs and flavored berries including juniper, reportedly were used in brewing. For example, an old circa 1500 A.D., recipe calls for 0.5 oz. juniper added to the boil to 2 gallons of beer (1 oz. juniper per 512 oz. of beer, or 1,951 mg. juniper/liter). See *Herbs Used in Brewing Beer and Ale* by Peggy Gilmour (date unknown). A more recent recipe, calls for addition during the boil of 1 lb. of juniper berry to 50 bbls. of finished wort (1 lb. juniper berry to 13,000 lbs. of beer, or 76 mg. juniper/liter. See *Brewing Techniques-Explorations in Pre-Prohibition American Lagers* by George Fix, May/June, 1994. Another recipe calls for addition during the boil of 1 oz. dry juniper berry to 20 liters (1.75 oz. dry juniper berry to 1 liter of beer, 57,000 mg. juniper/liter) to provide a "hint" or more of juniper. See *Brother Galore's Trehuggers Ale* (author unknown), Oct. 28, 1998. A recipe from Finland calls for 0.5 lbs. dried juniper berry added to the mash to 10 gallons of beer (1 lb. dried juniper berry to 1,660 lbs. of beer, 602 mg. juniper/liter). (See Homebrew Digest #1920, by Jack D. Hill, Dec. 27, 1995.

All of these recipes call for addition of juniper berries during the brewing process, and employ juniper berries at sufficiently high levels to impart a distinctive juniper flavor to the brewed beverage.

The present invention adds juniper berries after completion of the brewing process, and uses juniper berry oil at a far lower concentration, i.e. below the threshold, where it imparts any perceptible juniper berry flavor to the beverage. Thus, in accordance with the present invention juniper berry oil is added to a brewed malt beverage in an amount below the amount that would add any perceptible juniper berry flavor to the brewed beverage. More particularly, in accordance with the present invention juniper berry oil is added to a brewed malt beverage, in an amount between 0.010 ppm and 0.350 ppm, preferably about 0.015 ppm to 0.070 ppm. Addition of less than about 0.015 ppm appears to provide little effect in mitigating or nullifying bitterness while addition of more than about 0.35 ppm appears to provide little additional effect in mitigating or nullifying bitterness. Preferably, the amount of juniper berry oil added is 50 to 100 times less than the amount needed to provide a perceptible aroma and taste of juniper berry to the beverage.

The juniper berry oil may be added at any time following completion of the brewing process, i.e. following fermentation and before packaging. The juniper berries may be added as fresh or dried berries or as an oil or oil extract during or following chilling and aging and before filtering, or the juniper berry oil may be added as an oil or oil extract following aging and filtering. No difference in effect has been observed as to the timing of the addition of the juniper berries so long as the juniper berries or juniper berry oil is added after fermentation.

The resulting malt beverage has a similar aroma of malt beverages made without the addition of juniper berry oil, but without the typical bitterness of prior art malt beverages containing hops.

The invention will now be described with reference to the following examples.

EXAMPLE I

A trained panel of beer tasters (3 adult males and 2 adult females) tasted a commercial beer containing 10 ppm of isohumulones and the same beer treated with 0.35 ppm juniper berry oil. The panel correctly called the commercial beer as having from 7 to 12 ppm of isohumulones, while the juniper berry oil treated beer had no detectable level of bitterness.

EXAMPLE II

One thousand five hundred (1,500) pounds of corn grits were added to 30 bbls. of water, and the resulting mixture heated to boiling, with stirring, for 30 minutes in a cereal cooker.

Concurrently, 2,500 lbs of ground barley malt were added to 30 bbls. of water, and heated to 50° C. for 15 minutes, and the contents of the cereal cooker were then rapidly pumped over into the mash tub. The combined mash was held at 63° C. for 30 minutes, and then heated to 75° C. and transferred to a lauter tub. A clear liquid, drained from the mash, and hot water used to wash the adhering liquid from the grains are run into a kettle and boiled for 60 minutes. Thirty lbs. of hops were added during the boiling period.

The resulting liquid was again strained, cooled to about 10° C., and transferred to a fermentation tank to which was added one hundred lbs. of brewers' yeast. The resulting mixture was allowed to ferment for 7 days. After letting the yeast settle out, and filtering, half of the resulting filtered beer was treated with 0.015 ppm of juniper berry oil and bottled and chilled. The other half was bottled and chilled without added juniper berry oil.

The beer was tasted by the same trained taste panel as Example I, and similar results reported, i.e. the beer treated with juniper berry oil had no detectable level of bitterness.

EXAMPLE III

Four thousand (4,000) lbs. of ground barley malt were mixed with 40 bbls. of water at 48° C., and allowed to rest for 25 minutes. The temp. was raised to 65° C. and held there for 30 minutes. Then the temp. was raised to 75° C. and the mash transferred to a mash filter.

The filtrate and sparging were run into a kettle and 5,500 lbs. of corn syrup were added. The kettle was boiled with 20 lbs. of hops and then strained and cooled.

Yeast was added and the wort allowed to ferment. The fermented beer was transferred to a storage tank.

After 20 days the beer was filtered and half of the resulting beer was treated with 0.25 ppm of juniper berry oil, packaged and chilled. The other half was bottled and chilled without added juniper berry oil.

The beer was tasted by the same trained taste panel as Example I, and the results of the taste testing were the same as Example I.

What is claimed is:

1. A method of reducing bitterness of a brewed fermented malt beverage which comprises adding to said fermented beverage juniper berry oil in a below a threshold of taste amount of 0.010 ppm to 0.350 ppm based on said malt beverage.

2. A method according to claim 1, wherein said juniper berry oil is added during aging of the beverage.

3. A method according to claim 1, wherein said juniper berry oil is added following aging of and before packaging of the beverage.

4. A method according to claim 1, wherein said juniper berry oil is added as an extract.

5. A method according to claim 3, wherein said juniper berry oil is added as fresh or dried berries which are removed prior to packaging.

6. A method according to claim 1, wherein said juniper berry oil is added to said malt beverage in an amount of 0.015 ppm to 0.070 ppm based on said malt beverage.

* * * * *